United States Patent Office 2,727,035
Patented Dec. 13, 1955

2,727,035

3-SUBSTITUTED-2-THIONO-4-KETO-THIAZANES

James Basil Bowers, Campbell, Calif., and Isaac Benghiat, Bronx, N. Y., assignors to Stauffer Chemical Company, a corporation of Delaware No Drawing. Application November 12, 1954,
Serial No. 468,574

3 Claims. (Cl. 260—243)

This invention relates to certain novel compositions of matter and particularly relates to certain 3-substituted 2-thiono-4-keto-thiazanes, which have outstanding fungicidal properties.

The compounds of the prevent invention have the following general formula:

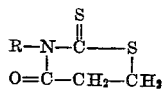

In the above formula, R represents a p-halo phenyl radical or a p-methoxyphenol radical.

3(p - methoxyphenyl)-2-thiono-4-keto-1,3-thiazane can be made as follows:

About 432 grams of ammonium p-methoxyphenyldithiocarbamate (2 moles) was slurried in one liter of ice water. 146 grams of β-propiolactone (2 moles) was added dropwise. The temperature rose gradually but was kept below 20° C. When all the β-propiolactone had been added a clear yellow solution was obtained. This solution was allowed to stand one hour. It was acidified strongly with concentrated hydrochloric acid and allowed to stand two hours. The solid which separated was separated by filtration, washed with water and dried in a vacuum oven. The yield was theoretical. Melting point after crystallization from 50% aqueous ethanol was 154–155°.

About 200 grams of this intermediate was heated with a mixture of 400 grams acetic anhydride and 0.4 ml. concentrated sulfuric acid. When the temperature reached 73°, an exothermic reaction set in, the temperature rising spontaneously to 125°. The mixture was allowed to cool. It was then mixed with water and the yellow solid separated by filtration. The product was digested with a mixture of one liter of acetone and one and one-half liters of isopropyl alcohol. The mixture was filtered while hot to remove a small amount of impurity. The product crystallized from the filtrate on cooling. About 94 grams of a yellow solid, melting point 152–154° (50.5% of theoretical) was obtained. Analysis %S: Calcd. 25.30; found 25.30.

In the same manner, 3-(p-chlorphenyl)-2-thiono-4-keto-1,3-thiazane may be made by using ammonium-p-chlorophenyldithiocarbamate instead of the ammonium p-methoxyphenyldithiocarbamate, as used above, and by refluxing the acetic anhydride solution for three hours. This compound was prepared in 89% yield and had an uncorrected melting point of 156–157° C. It was calculated that the compound should contain 24.9% sulfur, and it was actually found that the compound contained 25.41% sulfur.

Growth inhibition tests were conducted with various fungi on the above identified compounds. In testing compounds for fungitoxicity by this method, the compound is dispersed evenly through 20 ml. of warm potato dextrose agar in a petri dish. A series of plates containing various concentrations of the compound are prepared for each fungus species used. When the agar has cooled and solidified the center of each plate is seeded with a few spores of the desired fungus. After seven days' incubation in the dark under controlled temperatures, the diameter of the fungus colony on each plate is measured and the relationship between the growth on each plate and that of an untreated but seeded control plate is recorded as per cent control (or per cent inhibition of growth). The concentration of compound necessary to inhibit one-half the growth (LD–50) can then be calculated. In the case of the 3-p-methoxyphenyl compound, the LD–50 against A. niger was less than five parts per million, and for S. fructicola, less than five parts per million. In the case of the 3-p-chlorphenyl compound, the LD–50 was between five and ten parts per million for each of these fungi. By contrast, the LD–50 for 3-phenyl-2-thiono-4-keto thiazane is greater than 50 parts per million for both A. niger and S. fructicola. In the case of 2-thiono-4-keto thiazane, the LD–50 against A. niger is greater than 500 parts per million. It is thus apparent that the thiazanes of the present invention with a para substituted phenyl in position 3 have outstanding fungicidal properties as compared with similar compounds proposed in the past.

We claim:

1. As a new composition of matter, a compound having the formula:

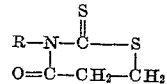

where R is a radical selected from the group consisting of p-methoxyphenyl and p-halophenyl.

2. As a new composition of matter, 3(p-methoxyphenyl)-2-thiono-4-keto-1,3-thiazane.

3. As a new composition of matter, 3(p-chlorophenyl)-2-thiono-4-keto-1,3-thiazane.

No references cited.